US008275495B2

(12) United States Patent
Joyeux et al.

(10) Patent No.: US 8,275,495 B2
(45) Date of Patent: Sep. 25, 2012

(54) METHOD AND DEVICE FOR MONITORING THE ABILITY TO NAVIGATE OF AN AIRCRAFT DURING A PHASE OF FLIGHT CLOSE TO THE GROUND

(75) Inventors: Fabien Joyeux, Toulouse (FR); Adrien Ott, Fresnes (FR); Melanie Morel, Meylan (FR); Romain Merat, Toulouse (FR); Stephane Dattler, Montlaur (FR); Francois Barre, Plaisance du Touch (FR); Armelle Seillier, Toulouse (FR)

(73) Assignees: Airbus Operations SAS, Toulouse (FR); Airbus, Blagnac (FR)

( * ) Notice: Subject to any disclaimer, the term of this patent is extended or adjusted under 35 U.S.C. 154(b) by 421 days.

(21) Appl. No.: 12/575,304

(22) Filed: Oct. 7, 2009

(65) Prior Publication Data

US 2010/0094486 A1    Apr. 15, 2010

(30) Foreign Application Priority Data

Oct. 9, 2008  (FR) ...................................... 08 05573

(51) Int. Cl.
*G01C 5/00* (2006.01)

(52) U.S. Cl. ........... 701/9; 701/3; 701/4; 701/6; 701/10; 701/11; 701/14; 701/15; 701/16; 701/18; 701/23; 701/408; 701/531; 340/970; 340/977; 340/979; 340/983; 340/948; 340/980; 340/982; 340/963; 340/945; 342/32; 342/119; 342/120; 342/121

(58) Field of Classification Search .................. 701/3, 4, 701/6, 9, 10, 11, 14, 15, 16, 18, 23; 340/970, 340/977, 979, 983, 948, 980, 982, 963, 945; 342/32, 119, 120, 121, 176
See application file for complete search history.

(56) References Cited

U.S. PATENT DOCUMENTS 3,999,007 A * 12/1976 Crane ........................... 348/123
(Continued)

FOREIGN PATENT DOCUMENTS

EP      1 560 096          8/2005
(Continued)

OTHER PUBLICATIONS

Preliminary Search Report dated Aug. 26, 2009.

*Primary Examiner* — Redhwan K Mawari
(74) *Attorney, Agent, or Firm* — Dickinson Wright PLLC

(57) ABSTRACT

Disclosed is a method and device, which provide an enhanced ability to monitor the navigation of an aircraft during a phase of flight in which the aircraft is close to the ground in which the aircraft uses positional information supplied by a satellite positioning system for the navigation. A display screen is used to display a first characteristic sign representing a selected setpoint value for a height parameter of the aircraft. The display screen also displays a second characteristic sign representing a current auxiliary value expressed in the form of an achievable height parameter. An alert is emitted when the second characteristic sign is determined to be within a predetermined height value of the first characteristic sign, and the alert is shown in visual format on the display screen. An alarm is also emitted following a predetermined time after the alert is emitted, if the setpoint value is not replaced by a new setpoint value.

8 Claims, 4 Drawing Sheets

U.S. PATENT DOCUMENTS

| | | | |
|---|---|---|---|
| 5,136,301 A * | 8/1992 | Bechtold et al. | 342/176 |
| 5,892,462 A * | 4/1999 | Tran | 340/961 |
| 6,233,522 B1 * | 5/2001 | Morici | 701/408 |
| 6,483,454 B1 * | 11/2002 | Torre et al. | 342/30 |
| 6,570,531 B1 * | 5/2003 | Stratton et al. | 342/357.53 |
| 7,499,773 B2 * | 3/2009 | Pire et al. | 701/3 |
| 7,990,285 B2 * | 8/2011 | Daveze et al. | 340/963 |
| 2005/0273249 A1 * | 12/2005 | Artini et al. | 701/120 |
| 2007/0055418 A1 * | 3/2007 | Pire et al. | 701/14 |
| 2008/0249674 A1 * | 10/2008 | Constans | 701/14 |
| 2009/0177400 A1 * | 7/2009 | Silly et al. | 701/301 |

FOREIGN PATENT DOCUMENTS

| | | |
|---|---|---|
| WO | 2007/067192 | 6/2007 |

* cited by examiner

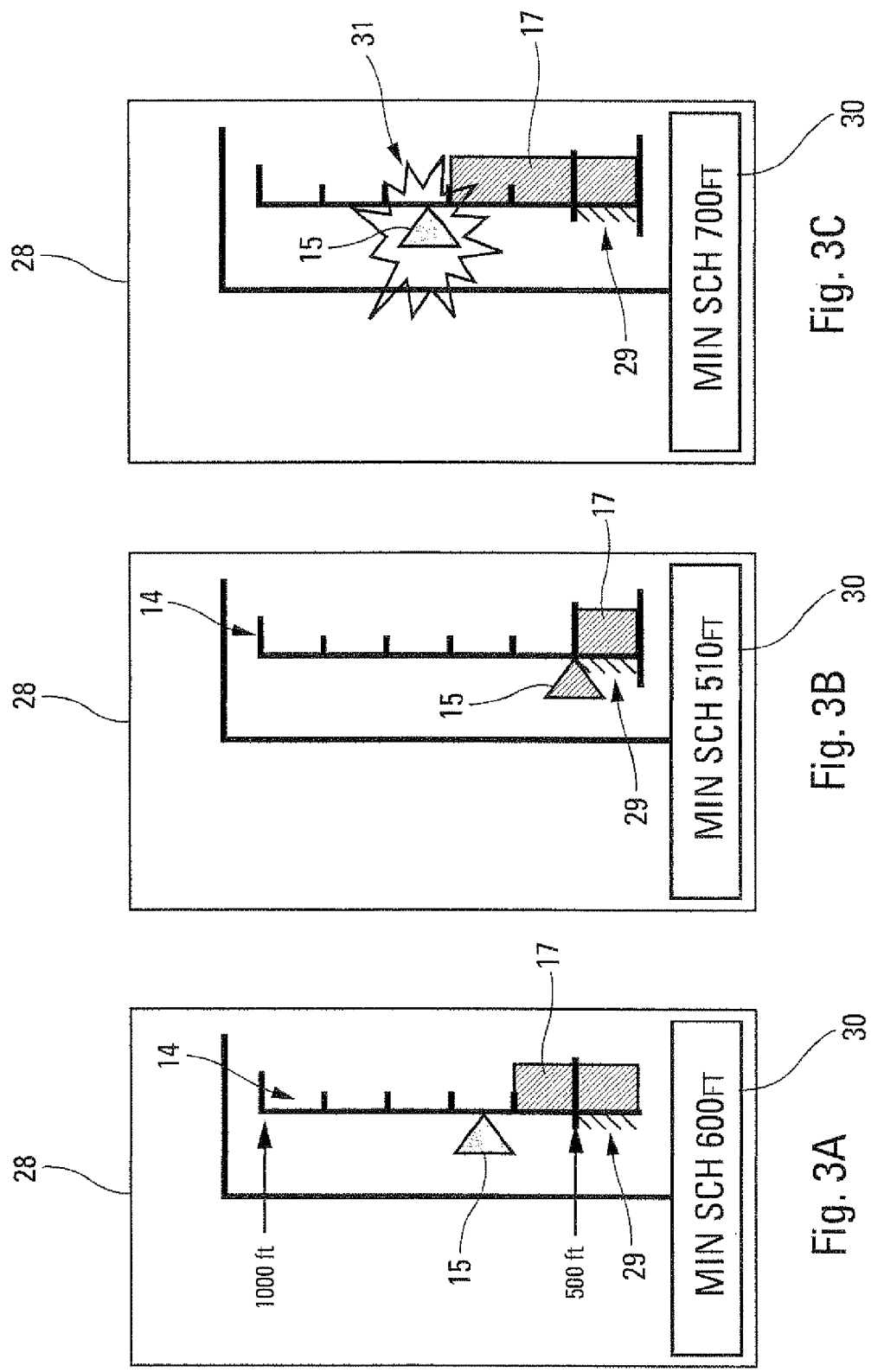

METHOD AND DEVICE FOR MONITORING THE ABILITY TO NAVIGATE OF AN AIRCRAFT DURING A PHASE OF FLIGHT CLOSE TO THE GROUND

FIELD OF THE INVENION

The present invention relates to a method and to a device for monitoring the ability to navigate of an aircraft, particularly a transport airplane, during a phase of flight close to the ground.

BACKGROUND OF THE INVENTION

The present invention applies to an aircraft which, for navigation, uses positional information supplied by a conventional satellite positioning system, for example of the GPS (the English-language abbreviation for "Global Positioning System" is commonly used), GALILEO or Glonass type. It is known that a satellite positioning system such as this uses a constellation of satellites capable of transmitting information to a moving object which information can be used by this object particularly in order to determine its position and speed.

Although not exclusively, the present invention applies more particularly to a transport airplane, particularly a military one, which is able, using an appropriate on-board management system, to carry out a phase of flight close to the ground, which corresponds:

either to a low level flight of the LLF (the English-language acronym for "Low Level Flight" is commonly used) type;

or an autonomous approach, of AA (the English-language acronym for "Autonomous Approach" is commonly used) type.

It is known that:

a low level flight is a flight during which the aircraft flies at a low level, generally following the map of the earth, that is to say following the contour of the terrain overflown, particularly in order to avoid being spotted (especially by ground radars). For such a low level flight, the pilot may input into the onboard system which manages this flight a setpoint value for a set clearance height of the SCH (the English-language acronym for "Set Clearance Height" is commonly used) type which is, for example, around 500 feet (about 150 meters). The low level flight path that is to be followed by the aircraft during this phase of flight is then calculated by said management system, in the usual way, at least at this set clearance height SCH which is defined above the contour of the terrain overflown; and an autonomous approach represents the approach to a landing zone, which is performed autonomously, that is to say without using facilities external to the aircraft and onboard means, particularly radar means liable to be detected from the outside for example, from ground surveillance stations. During an autonomous approach such as this, the aircraft pilot inputs into the onboard system which manages the approach a setpoint value for a decision height of the DH (the English-language acronym for "Decision Height" is widely used), which is for example around 200 feet (about 60 meters). This decision height DH represents the minimum height at which a decision with regard to landing has to be taken during this autonomous approach. In particular, an aborted approach procedure has to be begun if the visual contact needed to continue the approach with a view to landing has not been made at this decision height.

Particularly for obvious safety reasons, the aforementioned two phases (low level flight, autonomous approach) of flight close to the ground require very careful monitoring of the position of the aircraft, particularly with regard to its vertical component, which position is supplied by a satellite positioning system.

In order to achieve such monitoring, usually:

an alarm threshold is determined and associated with the setpoint value (set clearance height SCH or decision height DH) selected by the pilot;

repeatedly, a current error value is received which corresponds to an estimated current error in the vertical position (supplied by said satellite positioning system), and this current error value is compared against said alarm threshold; and if the current error value passes above the alarm threshold, an alarm is emitted.

The aforementioned alarm threshold therefore allows the aircraft to be protected at the level required by the corresponding phase of flight, and in the event that an estimate of the error value exceeds this alarm threshold, an alarm is triggered to indicate to the pilot that his navigation is degraded and that he needs to interrupt the mission he is flying.

The above approach has a major disadvantage namely that it is not possible to anticipate the triggering of the alarm and therefore to modify the mission (should that prove necessary in order to be able to accomplish it). Specifically, as soon as an alarm is emitted, the pilot has immediately to interrupt his mission and increase the altitude of the aircraft, for obvious safety reasons, because the position supplied by the positioning system is no longer reliable enough for the conditions under which the mission is to be carried out.

It is an object of the present invention to remedy the aforementioned disadvantages. The invention relates to a method for monitoring the ability to navigate an aircraft during a phase of flight close to the ground (low level flight or autonomous approach), said aircraft, particularly a transport airplane, using, for its navigation, positional information supplied by a satellite positioning system, said method particularly making it possible to anticipate the triggering of an alarm and, if appropriate, to modify a mission parameter so that the aircraft will be able to complete the assigned mission.

SUMMARY OF THE INVENTION

To this end, according to the invention, said method of the type whereby:

a) means are provided to allow a pilot of the aircraft to select a setpoint value for a height parameter (safe clearance height SCH or decision height DH), which represents a height with respect to the ground, expressed for example in feet, and which is used during said phase of flight (a low level flight or an autonomous approach);

b) an alarm threshold is determined automatically and associated with the setpoint value thus selected;

c) repeatedly, a current error value corresponding to an estimated current error in the vertical position of the aircraft, supplied by said satellite positioning system, is automatically received and each current error value thus received is automatically compared against said alarm threshold; and d) if a current error value is above said alarm threshold, an alarm is automatically emitted, is notable in that, in addition:

for each current error value received, a current auxiliary value is automatically determined (for example in feet or in meters) this being expressed in the form of an achievable performance relative to said height parameter;

a scale, graduated in height values, which is displayed on a display screen of the aircraft, displays:
- a first characteristic sign illustrating the setpoint value (SCH or DH) selected by the pilot; and
- a second characteristic sign illustrating the current auxiliary value (representative of the estimated current error in the vertical position of the aircraft);

an alert is emitted (or pre-alarm) when said second characteristic sign comes within a predetermined height value of said first characteristic sign, for example comes within 5 meters of it; and means are provided to allow the pilot to replace said setpoint value [selected in step a)] by a new setpoint value (which makes it possible to avoid triggering the alarm).

Thus, according to the invention, the current error value (which is generally received from the satellite positioning system, together with a position value with which it is associated) is converted into a current auxiliary value which is expressed in the form of an (achievable) parameter relative to said height parameter, for which the pilot has input a setpoint value. This current auxiliary value is therefore a value of height with respect to the ground, which is representative of the current error value. In consequence, the pilot is in a position to monitor the change in this current error value with respect to the selected setpoint value, because these two values are presented on the same scale which is displayed on a display screen of the aircraft, preferably a screen which displays the vertical profile or contour.

Through this monitoring, the pilot is in a position to anticipate a potential alarm and if appropriate to modify at least one parameter of the mission, namely the setpoint value, in order to avoid triggering an alarm. In addition, in order to choose a new setpoint value, he is able in particular to take account of the achievable performance indications contained in said second characteristic sign (which illustrates the current auxiliary value).

Advantageously, an alarm is emitted if, after a predetermined time, for example 20 seconds, following an alert, the pilot has not replaced the setpoint value with a higher (and high enough to avoid the alarm) setpoint value.

Furthermore, to make the information supplied to the pilot easier to read, advantageously said scale additionally displays a numerical value which corresponds to said current auxiliary value.

Furthermore, in one particular embodiment, said alert is shown in a visual format on said display screen, for example by flashing and/or a change in color of said first characteristic sign (illustrating the setpoint value selected by the pilot).

Furthermore, advantageously:
- said alarm threshold is determined as a function of the selected setpoint value, using at least a predetermined look-up table that indicates the relationship between the alarm threshold and the setpoint value; and/or
- said current auxiliary value, which represents a value of said height parameter as a function of the current error value is determined using said look-up table, the current error value being for these purposes likened to an alarm threshold value.

Furthermore, in a first embodiment:
said phase of flight is a phase of low level flight; and
said height parameter is a set clearance height, SCH, which is such that a low level flight path that is to be followed during said phase of flight, is calculated at least at this set clearance height SCH above a contour of the terrain overflown.

What is more, in a second embodiment:
said phase of flight is an autonomous approach with a view to landing;
said height parameter is a decision height DH representing the minimum height at which a decision about landing has to be taken during the autonomous approach; and
the pilot can replace a current setpoint value (of said decision height) with a new setpoint value as long as the aircraft is situated above a predetermined height (with respect to the ground), for example 1000 feet (about 300 meters) during the autonomous approach.

The present invention also relates to a device for monitoring the ability to navigate an aircraft during a phase of flight close to the ground, said aircraft using, for its navigation, positional information supplied by a satellite positioning system.

To this end, according to the invention, said device of the type comprising:
- first means allowing a pilot of the aircraft to select a setpoint value (SCH or DH) for a height parameter, which is then used during said phase of flight;
- second means for automatically determining an alarm threshold which is associated with the setpoint value selected using said first means;
- third means for repeatedly automatically receiving a current error value corresponding to an estimated current error in the vertical position of the aircraft, which is supplied by said satellite positioning system, and for automatically comparing each current error value thus received against the alarm threshold determined by said second means; and
- fourth means for automatically emitting an alarm if a current error value is above said alarm threshold, is notable in that it additionally comprises:
- fifth means for automatically determining, for each current error value received, a current auxiliary value which is expressed in the form of an achievable performance relative to said height parameter;
- a display screen for displaying on a scale graduated in height values:
  - a first characteristic sign illustrating the setpoint value selected by the pilot; and
  - a second characteristic sign illustrating the current auxiliary value and determined by said fifth means;
- means (which are, for example, incorporated into the display screen) for emitting an alert (preferably of visual type) when said second characteristic sign comes within a predetermined height value of said first characteristic sign; and
- said first means, which allow the pilot to replace said setpoint value with a new setpoint value.

The monitoring device according to the invention particularly allows the pilot to anticipate an alarm, by constantly checking his ability to navigate, and potentially by altering a mission preparation parameter, namely said setpoint value SCH or DH, in order to raise the alarm threshold and thus increase the availability of the monitoring afforded by said device.

The present invention also relates to an aircraft, particularly a military transport airplane, which comprises a monitoring device like the aforementioned one.

BRIEF DESCRIPTION OF THE DRAWINGS

The figures of the attached drawing will make it easy to understand how the invention may be embodied. In these figures, identical references denote elements that are similar.

FIGS. 3A, 3B and 3C illustrate displays that can be implemented during different flight situations encountered during a low level flight.

DETAILED DESCRIPTION OF THE INVENTION

Figure 1:
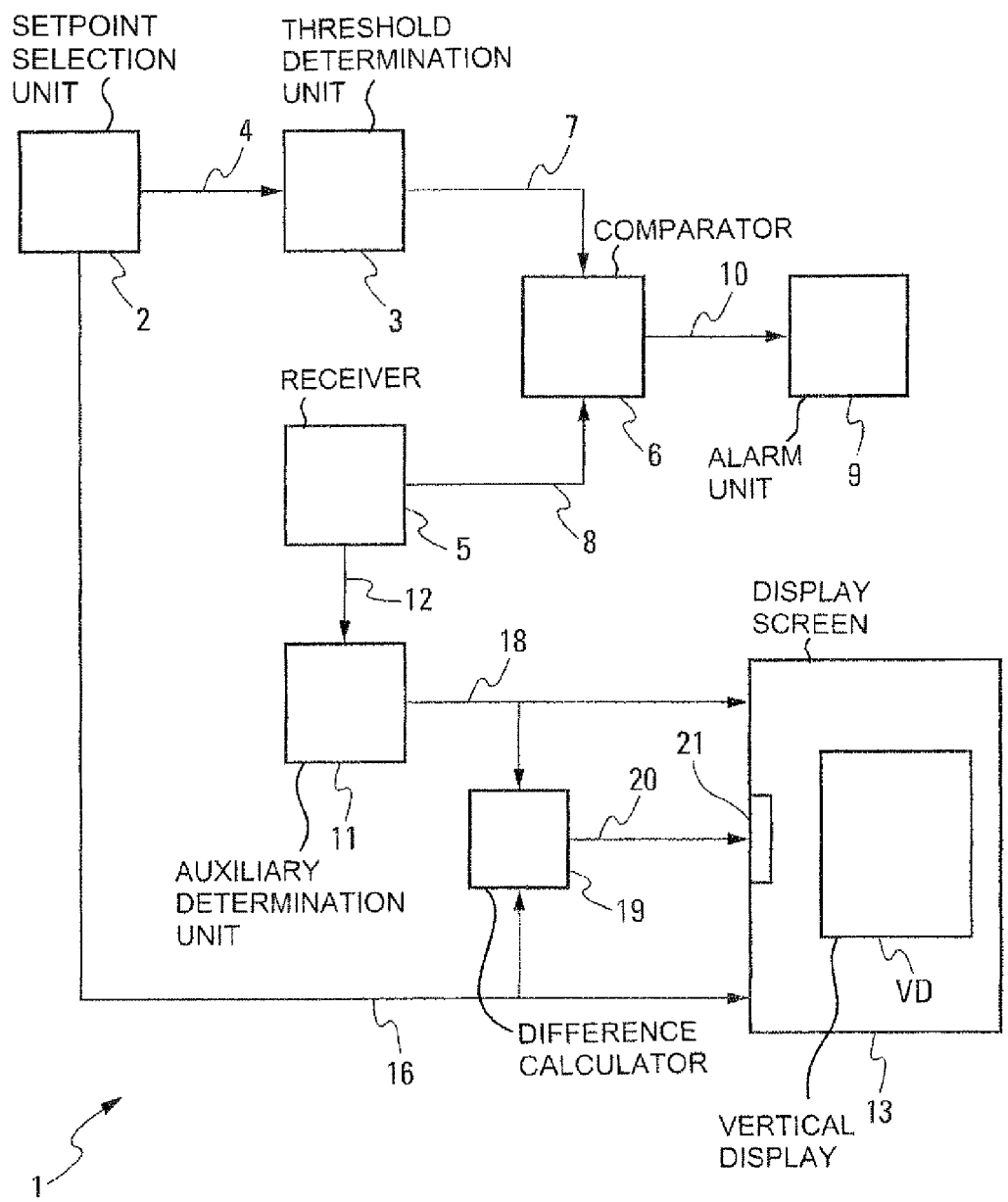
FIG. 1 is a block diagram of the monitoring device according to the invention.

The monitoring device 1 according to the invention and depicted schematically in FIG. 1 is intended to monitor the ability to navigate of an aircraft (not depicted), particularly a transport airplane, especially a military one, during a phase of flight close to the ground.

Although not exclusively, the monitoring device 1 applies more specifically to a phase of flight close to the ground which corresponds:

to a low level flight of LLF (the English-acronym for "Low Level Flight") is commonly used) type; or to an autonomous approach of AA (the English-language acronym for "Autonomous Approach" is widely used) type.

To this end, said aircraft uses, for its navigation, information, particularly positional information, supplied to it by a conventional satellite positioning system (not depicted), for example of the GPS (the English-language acronym for "Global Positioning System" is widely used), GALILEO or Glonass type.

To perform this monitoring, said monitoring device 1 comprises:

means 2 allowing the pilot (or a member of the crew) of the aircraft to select (or input) a setpoint value SCH or DH for a height parameter (namely a set clearance height SCH for a low level flight and a decision height DH for an autonomous approach). This setpoint value is used during said phase of flight by a conventional management system (not depicted) which is onboard the aircraft and which in the usual way manages this phase of flight (low level flight or autonomous approach);

means 3 which are connected via a link 4 to the means 2 and which are formed in such a way as automatically to determine an alarm threshold which is associated with said setpoint value selected by the pilot;

means 5 for automatically receiving, in the usual way, a current error value corresponding to an estimated current error in the vertical position (supplied by said satellite positioning system). Said means 5 receive this estimated error directly from the satellite positioning system or from a conventional system for monitoring said positional system;

means 6 which are connected by links 7 and 8 to said means 3 and 5 respectively and which are formed in such a way as automatically to compare each current error value received from said means 5 against said alarm threshold calculated by said means 3; and means 9 which are connected by a link 10 to said means 6 and which are formed in such a way as automatically to emit on the flight deck an alarm, of audible and/or visual type, if the comparisons performed by the means 6 have detected that an estimated current error is above the alarm threshold.

Figure 2:
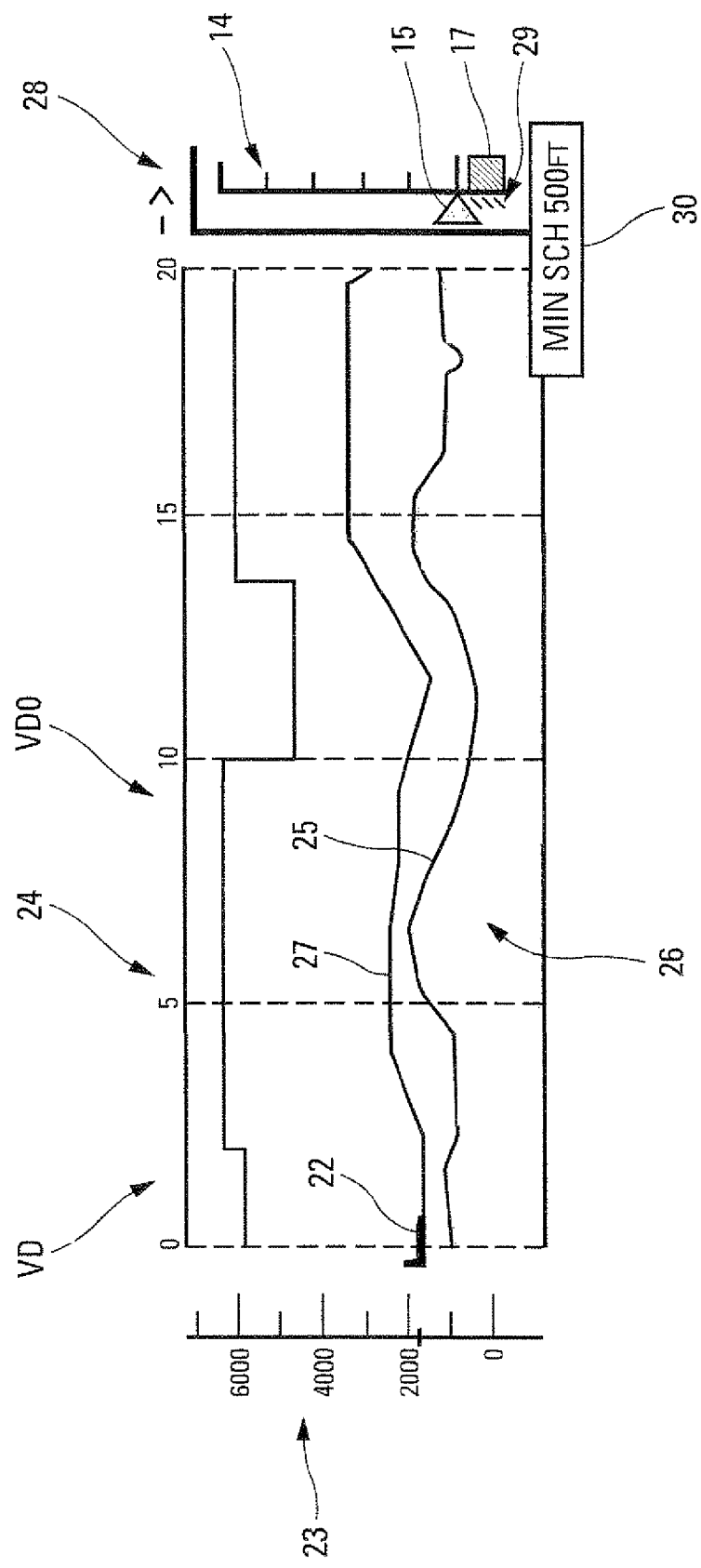
FIG. 2 schematically illustrates a vertical display used on a display screen of a monitoring device according to the invention.

Furthermore, in order to improve this monitoring, and especially to allow triggering of an alarm to be anticipated, said device 1 additionally comprises:

means 11 which are connected by a link 12 to said means 5 and which are formed in such a way as automatically to determine, for each current error value received, a current auxiliary value which represents an achievable performance relative to said height parameter, that is to say a height (expressed in feet or in meters for example) which is defined with respect to the ground and which is representative of the estimated current error regarding the received vertical position of the aircraft;

a display screen 13 to display, on a scale 14 graduated in height values (preferably in feet), as represented by way of example in FIG. 2:

a characteristic sign 15 illustrating the setpoint value selected by the pilot using the means 2 and received by a link 16; and a characteristic sign 17 illustrating the current auxiliary value determined by the means 11 and received by a link 8;

means 19 which are connected to said means 2 and 11 and which calculate the difference between the current auxiliary value and the setpoint value DH or SCH and which, via a link 20, trigger alert means 21 when this difference drops below a predetermined height value, for example 5 meters.

The alert means 21 therefore emit an alert (or pre-alarm) when the characteristic sign 17 comes within a predetermined height value of the characteristic sign 15.

For preference, this height value (for example 5 meters) is chosen so that an alarm is emitted by the means 9 if, a predetermined time (for example 20 seconds) following such an alert, the pilot has not replaced the setpoint value with a new setpoint value which is acknowledged by the onboard means. This new setpoint value needs to be higher than the previous setpoint value, and to be higher by enough of a margin to avoid triggering an alarm.

For preference, said alert is raised visually on said display screen 13, as specified hereinbelow.

Thus, the monitoring device 1 according to the invention converts the current error value (which is generally received from the satellite positioning system, together with a position value) into a current auxiliary value which is expressed in the form of an (achievable) parameter relative to the height parameter, for which the pilot has input a setpoint value, and which is displayed. As a result, the pilot is in a position to monitor the change in this current error value with respect to the selected setpoint value by looking at the screen 13, because these two values are presented on the same scale 14 which is displayed on the screen 13, preferably a screen which displays the vertical profile or contour. By monitoring in this way, the pilot is in a position to anticipate a potential alarm and, if appropriate, to modify (using the means 2) at least one parameter of the mission, namely said setpoint value DH or SCH. In addition, to choose a new setpoint value, he can especially take account of the achievable performance indications contained in said characteristic sign 17 which illustrates the current auxiliary value.

Thus, the monitoring device 1 according to the invention particularly makes it possible to achieve the following advantages:

to anticipate the alarm, via a display of the estimated error in the position (current auxiliary value);

to display the achievable performance; and to have the possibility of modifying the parameters of the mission, namely said setpoint value.

In a preferred embodiment:

said means 3 determine said alarm threshold as a function of the selected setpoint value, and do so using at least one predetermined look-up table that indicates the relationship between the alarm threshold and the setpoint value. This look-up table is formed in the usual way after detailed analysis, at different heights, of the error budgets allocated to navigation and guidance, which has been used to determine the alarm thresholds that will adhere to this budget; and said means 11 determine said current auxiliary value, which represents a value of said height parameter, as a function of the current error value, using said look-up table, the current error value being likened for these purposes to an alarm threshold value.

In a preferred embodiment, as depicted in FIG. 2, said scale 14 is presented on a vertical display of the VD (the English-language acronym for "Vertical Display" is widely used) type which includes a conventional VDO display. This conventional VDO display particularly comprises:

- a symbol 22 illustrating the current position of the aircraft;
- an altitude scale 23;
- a distance scale 24 defined from the current position of the aircraft;
- a profile or contour 25 illustrating, in the vertical plane, the contour of the terrain 26 being overflown; and
- a curve 27 illustrating the path that the aircraft is to follow above the ground.

The situation depicted in FIG. 2 corresponds to a phase of low level flight, for which the flight path 27 of the aircraft is at a low level above the contour 25 of the terrain overflown 26 (and is so by at least a decision height SCH).

The display 28 used according to the present invention is presented to the right of this conventional VDO display on the vertical display VD.

In a preferred embodiment:

said characteristic sign 15 which illustrates the setpoint value selected by the pilot is presented in the form of an arrow, for example cyan in color; and the characteristic sign 17 which illustrates the current auxiliary value is presented in the form of a strip, for example amber in color.

The arrow 15 therefore indicates the value that cannot be exceeded without triggering an alarm that will force the mission to be abandoned. Hence, when the upper limit of the strip 17 moves closer to the arrow 15, the pilot has immediately to increase the setpoint value (using the means 2).

The display 28 according to the invention additionally comprises:

- a hatched region 29 which is intended to remind the pilot that, for procedural reasons, he cannot select a setpoint value located in this hatched region 29, that is to say which is lower than the value identified by the upper limit of this hatched region 29. A procedure is a series of actions to be carried out in order to return to the required conditions for a given phase (starting engines, take off, approach, etc.). In the example considered, below 200 feet, the system no longer guarantees the precision required for an autonomous approach, and so if the pilot inputs a decision height of less than 200 ft, he is not following the procedure; and
- a numerical display 30 indicating the current auxiliary value ("MIN SCH 500 FT"), namely a value known as "MIN SCH" (of 500 feet in the example of FIG. 2) which illustrates the error in position.

In a first embodiment, the monitoring device 1 according to the invention is intended to monitor a low level flight of LLF type. In this case, the pilot, when preparing for his mission, determines, while on the ground, the set clearance height SCH that he will be able to fly, as a function of the (customary) estimated error predictions, based on the constellation of satellites of the satellite positioning system used. Associated with each setpoint value is an uncertainty on the calculation of the vertical position of the aircraft and therefore an alarm threshold which is determined by said means 3 using at least one look-up table like the aforementioned one.

Right from the start of the LLF phase of flight (that is to say once the LLF mode has been alarmed), the monitoring device 1 displays the status of the error estimate (sign 17) with respect to the alarm threshold (sign 15) as depicted in FIG. 3A. This error estimate, which is valid only at an instant t, and not for part of the phase of flight, changes throughout the low level flight as a function of the constellation of satellites seen by the aircraft, it being possible for some satellites to be masked by the lie of the land for example.

If an estimate falls to close to the alarm threshold, for example within five meters of the alarm threshold, the pilot is invited to climb to a usual safe altitude, which corresponds to a safe altitude to be regained in the event of a problem during a phase of flight of the LLF type. If he does not climb during a predetermined length of time which follows, for example in the next 20 seconds, which is the time it is considered to take for the error estimate to reach the alarm threshold, the means 9 emit an alarm inviting the pilot to abandon the mission. By contrast, if he climbs in time, he can check his navigation parameters in complete safety, without a risk of colliding with the ground. He can then descend again, using a new setpoint value that he can fly, based on his present-time navigation performance.

The monitoring device 1 according to the invention therefore makes it possible to encourage mission availability by allowing the pilot to descend again, even if the new altitude is higher than the altitude initially intended. An alarm by itself does not make it possible to determine that the quality of the position was no longer sufficient to carry out the intended mission, without the ability to anticipate, or to determine which setpoint value would allow for mission success. The monitoring device 1 according to the invention therefore makes it possible to overcome these disadvantages.

In the various examples depicted in FIGS. 3A, 3B and 3C respectively, which therefore correspond to a phase of flight of the LLF type:

- the scale 14 is graduated from 500 feet to 1000 feet;
- the hatched region 29 below the height of 500 feet is intended to indicate to the pilot that, following the procedures, it is not possible to select a setpoint value lower than 500 feet;
- the strip 17, for example amber in color, represents the status of the current navigation (the estimate in vertical error being converted into achievable performance in order to make it easier for the pilot to understand using a known parameter); and
- the arrow 15, for example cyan in color, represents the set clearance height SCH selected by the pilot, using the means 2 which for example form part of a flight control unit of the FCU (the English-language acronym for "Flight Control Unit" is widely used) type and it displays the threshold that the uncertainty on the position calculation must not exceed.

When the strip 17, for example amber in color, reaches the height of this arrow 15, the latter (initially of a different color) adopts the same color, as illustrated by the hatching in the example of FIG. 3B, which corresponds to the emitting of an alert (or pre-alarm). When this happens, the pilot has a predetermined length of time, for example 20 seconds (time based on the maximum drift in the error estimate) to increase the setpoint value SCH and validate it, using the means 2, failing which the alarm will be triggered and the mission interrupted (by the means 9).

If the setpoint value is modified using the means 2, because acknowledging a new setpoint value SCH is not instantaneous (it takes around a few seconds), the time taken to calculate a new low level flight path, the arrow 15 flashes, as shown (by a representation 31) in the example of FIG. 3C, until such time as the new setpoint value is acknowledged, and the monitoring device 1 continues to compare the current error estimate against the alarm threshold corresponding to the former setpoint value.

Under the scale 14, the strip 17 illustrating achievable performance is displayed by numerical indication 30 ("MIN SCH 500 FT") which is, for example, rounded up to the nearest ten feet.

In the situation of FIG. 3A, with the current navigation quality, the pilot can select a setpoint value of at least six hundred feet. However, in order to avoid any risk of alarm or alert due to variations in the error estimate, he may provide a margin and choose, for example, a value of 700 feet. Of course, even if the navigation qualities so permit, the setpoint value cannot be below the limit indicated by the hatched region 29, unlike the strip 17 which indicates the true status of the navigation.

Furthermore, in a second embodiment, the monitoring device 1 according to the invention is applied to an aircraft, particularly to a military transport airplane, making an autonomous approach.

It is known that, during such an autonomous approach, the pilot, on the basis of prediction information and data displayed on an approach map, chooses the larger of the decision heights DH given by these means and inputs it using the means 2. The means 3 then determine the alarm threshold on the basis of this input decision height DH. If the pilot does not input any value, the monitoring device 1 according to the invention uses a default value, for example 200 feet (about 60 meters).

The monitoring of the navigation quality implemented by the monitoring device 1 begins as soon as an autonomous approach is entered into the system managing the approach on the aircraft. However, the corresponding alarms and alerts are provided later, and differ according to whether the aircraft is flying above or below a predetermined height, preferably 1000 feet, with respect to the threshold altitude for the runway, on which he is intended to land at the end of the approach.

At the start of its approach, with the aircraft situated above this predetermined height (1000 feet), the error estimates are first of all compared against the threshold corresponding to a decision height DH of 1000 feet. Hence, if the constellation of visible satellites is very small or if the navigation signals are of poor quality, the estimated error in position (vertical or horizontal position) is great, and the pilot may be forced to abandon his mission whatever the decision height input.

By contrast, in other (far more frequent) cases, the error estimate may be compared against the alarm threshold determined for the decision height DH selected by the pilot. If the error estimate exceeds the alarm threshold, the pilot can adjust the decision height DH, as long as the aircraft is flying at above 1000 feet, because below 1000 feet, the monitoring device 1 takes into consideration the alarm threshold corresponding to the decision height input (which is then taken into consideration). If the pilot does not modify it, the alarm to interrupt the mission will be triggered when 1000 feet is crossed.

Once below the height of 1000 feet, the pilot may observe the change in the error estimate, but he may no longer modify the decision height DH, and if the error estimate reaches the corresponding alarm threshold, he will have to abandon the mission. The monitoring device 1 according to the invention may therefore encourage mission availability by allowing the pilot (accept in the rare instances of poor coverage of the satellite positioning system for example) to adjust the decision height DH right up to the last moment, and thus succeed with his approach.

Figure 4C:
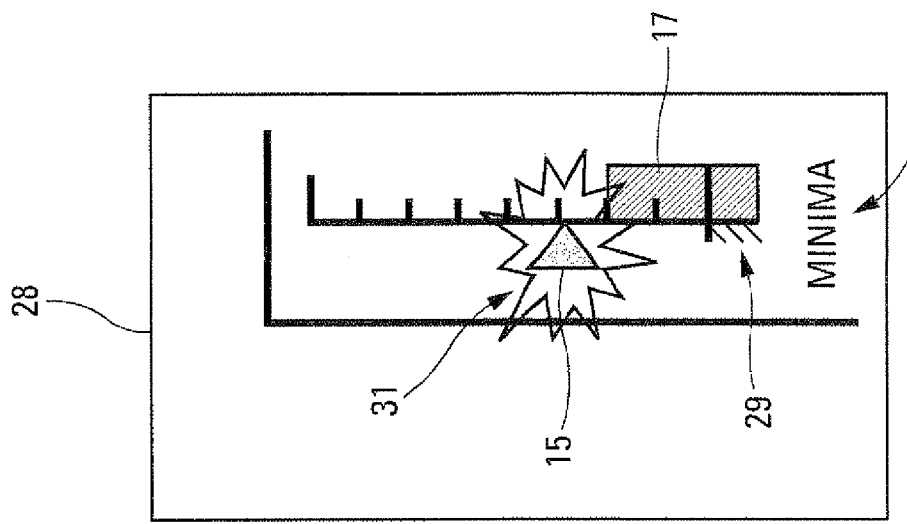
FIGS. 4A, 4B and 4C illustrate displays that can be implemented during various flight situations encountered during an autonomous approach.
Figure 4B:
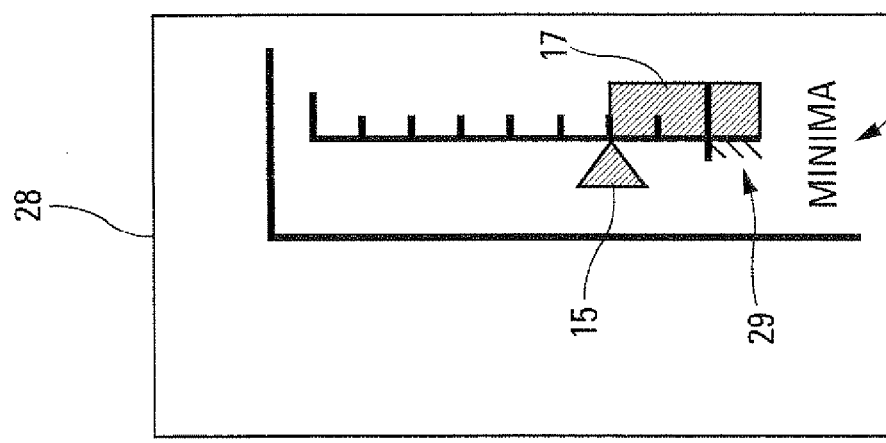
Figure 4A:
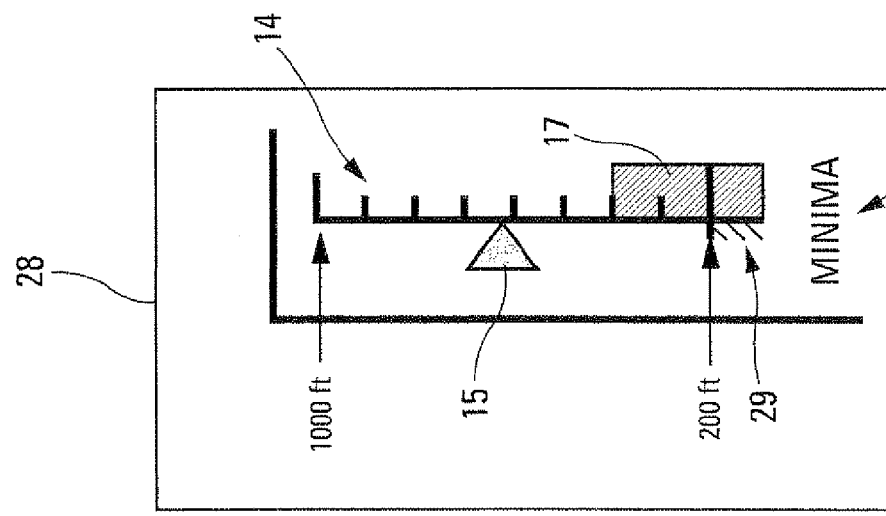

As may be seen in the examples of FIGS. 4A, 4B and 4C which relate to such an autonomous approach:

the scale is graduated from 200 feet (ft) to 1000 ft (ft). The hatched region 29 below 200 feet is intended to indicate to the pilot that, for procedural reasons, he is not authorized to select a decision height DH of less than 200 feet. Hence, if the pilot inputs a decision height of less than 200 feet (or of higher than 1000 ft), the arrow 15 will be displayed in dotted line at 200 feet (or 1000 feet, respectively);

the strip 17, for example amber in color, represents the status of the current navigation (the estimates in the vertical and horizontal error being converted into achievable performance for ease of understanding). This strip 17 may extend below the 200-feet limit, if the error estimates are low; and the arrow 15, for example cyan in color, represents the decision height DH selected by the pilot, using the means 2 which, for example, control a page of a flight management system which is devoted to autonomous approach.

When the strip 17 reaches the height of the arrow 15, the latter becomes amber as depicted in the example of FIG. 4B. When this happens, if the aircraft is at above 1000 feet, the pilot can adjust the decision height DH in order once again to fall below the alarm threshold. By contrast, if the aircraft is below 1000 feet, the pilot cannot change the decision height DH and has to abandon the approach because the system uses the threshold value associated with the decision height to monitor the navigation, rather than the threshold associated with 1000 feet as was the case when the aircraft was flying at above 1000 ft.

If the decision height DH is modified, because a new value cannot be acknowledged instantaneously (it takes a few seconds), the arrow 15 flashes until it has been acknowledged, as depicted (by 31) in FIG. 4C.

Under the scale 14, the achievable performance is displayed by a numerical indication 30 ("MINIMA").

The strip 17 is displayed on the vertical display VD as soon as the decision height DH is entered (unless a phase of low level flight precedes it in the flight plan), but is no longer displayed when the decision height DH is reached.

In the aforementioned two embodiments, the monitoring device 1 according to the invention therefore allows the pilot to monitor the change in the navigation performance of the aircraft and also to anticipate a degradation therein, being able, in such an event, to chose setpoint values which are associated with less restrictive alarm thresholds.

The invention claimed is:

1. A method for monitoring the ability to navigate an aircraft during a phase of flight close to the ground, said aircraft using, for its navigation, positional information supplied by a satellite positioning system, the method comprising:

a) selecting in a setpoint selection unit a setpoint value for a height parameter, which is used during said phase of flight;

b) determining, by a threshold determination unit, an alarm threshold associated with the selected setpoint value;

c) receiving automatically and repeatedly, by a receiver, a current error value corresponding to an estimated current error of a current vertical position of the aircraft, supplied by said satellite positioning system, and automatically comparing, by a comparator, each received current error value with said alarm threshold;

d) emitting an alarm indicating a condition in which the current error value is above said alarm threshold e) determining, by an auxiliary determination unit, for each received current error value, a current auxiliary value expressed in the form of an achievable performance relative to said height parameter;

f) displaying, on a display screen of the aircraft, the display screen having a scale graduated according to height values:
  a first characteristic sign representing the selected setpoint value; and
  a second characteristic sign representing illustrating the current auxiliary value; and g) emitting an alert when said second characteristic sign comes within a predetermined height value of said first characteristic sign, and showing the alert in visual format on the display screen;

wherein:
the alarm is emitted following a predetermined time after the alert is emitted if said setpoint value is not replaced by a new setpoint value.

2. The method as claimed in claim 1, wherein a numerical value which corresponds to said current auxiliary value is displayed on said display screen.

3. The method as claimed in claim 1, wherein said alarm threshold is determined as a function of the selected setpoint value, using at least a predetermined look-up table that indicates the relationship between the alarm threshold and the setpoint value.

4. The method as claimed in claim 3, wherein said current auxiliary value, which represents a value of said height parameter as a function of the current error value is determined using said look-up table, the current error value representing an alarm threshold value.

5. The method as claimed in claim 1, wherein:
said phase of flight is a phase of low level flight; and
said height parameter is a set clearance height, which is such that a low level flight path that is to be followed during said phase of flight, is calculated at the set clearance height above a contour of the terrain overflown.

6. The method as claimed in claim 1, wherein:
said phase of flight is an autonomous approach with a view to landing;
said height parameter is a decision height representing the minimum height at which a decision about landing has to be taken during the autonomous approach; and
the current setpoint value of said decision height is replaceable with a new setpoint value as long as the aircraft is situated above a predetermined height with respect to the ground during the autonomous approach.

7. A monitoring device for monitoring the ability to navigate an aircraft during a phase of flight close to the ground, said aircraft using, for its navigation, positional information supplied by a satellite positioning system, said device comprising:
setpoint selection unit in which a pilot of the aircraft selects a setpoint value for a height parameter, which is then used during said phase of flight;
threshold determination unit that automatically determines an alarm threshold associated with the selected setpoint value;
receiver that repeatedly automatically receives a current error value corresponding to an estimated current error of a current vertical position of the aircraft, which is supplied by said satellite positioning system;
comparator that automatically compares each received current error value against the alarm threshold determined by said alarm threshold unit;
alarm unit that automatically emits an alarm indicating that the current error value is above said alarm threshold;
auxiliary determination unit that automatically determines, for each received current error value, a current auxiliary value expressed in the form of an achievable performance relative to said height parameter;
a display screen that displays on a scale graduated according to height values:
  a first characteristic sign representing the setpoint value selected by the pilot; and
  a second characteristic sign representing the current auxiliary value determined by said auxiliary determination unit; and
alert unit configured to emit an alert when said second characteristic sign comes within a predetermined height value of said first characteristic sign, with the alert being shown in visual format on the display screen;
wherein:
said alarm unit and said alert unit are configured such that, following a predetermined time after the alert is emitted by the alert unit, the alarm is emitted by the alarm unit if the pilot does not replace said setpoint value with a new setpoint value.

8. An aircraft, comprising the monitoring device of claim 7.

* * * * *